United States Patent [19]
Logan et al.

[11] Patent Number: 5,683,251
[45] Date of Patent: Nov. 4, 1997

[54] SYSTEM AND METHOD FOR TRACKING DIETARY CONSUMPTION

[76] Inventors: Kathleen Logan, 3134 Hannah's Pond La.; William J. Curry; Lauren C. Curry, both of 12709 Turberville Ct., all of Herndon, Va. 22071

[21] Appl. No.: 609,800

[22] Filed: Mar. 1, 1996

[51] Int. Cl.$^6$ .................................................. G09B 19/00
[52] U.S. Cl. ........................ 434/127; 434/430; 434/406; 273/156
[58] Field of Search ...................................... 434/127, 238, 434/430, 428, 262, 406, 247; 40/621; 273/156, 157 R, 153 R

[56] References Cited

U.S. PATENT DOCUMENTS

| | | | |
|---|---|---|---|
| 3,769,720 | 11/1973 | Terrones | 434/127 |
| 4,652,241 | 3/1987 | McCarty | 434/430 X |
| 4,730,831 | 3/1988 | De Sio | 434/127 X |
| 4,832,603 | 5/1989 | Basil | 434/127 |

FOREIGN PATENT DOCUMENTS

| | | | |
|---|---|---|---|
| 1271461 | 7/1990 | Canada | 434/127 |
| 830480 | 3/1960 | United Kingdom | 434/428 |

*Primary Examiner*—Jeffrey A. Smith
*Attorney, Agent, or Firm*—Papan Devnani; Thomas A. Powers; Chandrakant Shroff

[57] ABSTRACT

The invention is a device for teaching children about good nutrition, comprising a board divided into a plurality of regions and a plurality of tokens adapted to stick to the board. The tokens comprise at least:

a) a plurality of first tokens, each of the first tokens corresponding to a single portion of a food or beverage item selected from a first specific food group; and b) a plurality of second tokens, each of the second tokens corresponding to a single portion of a food or beverage item selected from a second specific food group. The regions on the board comprise at least:

a) a first region, where the first region is labelled as corresponding to the first specific food group; and b) a second region, where the second region is (1) labelled as corresponding to the second specific food group.

In use, each of the first tokens is adapted to be moved onto the first region of the board, allowing an individual to easily record consumption of a portion of food or beverage from the first specific food group; and each of the second tokens is adapted to be moved onto the second region of the board, allowing an individual to easily record consumption of a portion of food or beverage from the second specific food group. By adjusting the number of types of tokens and the number of regions on the board, as few or as many food groups as desired may be tracked.

27 Claims, 5 Drawing Sheets

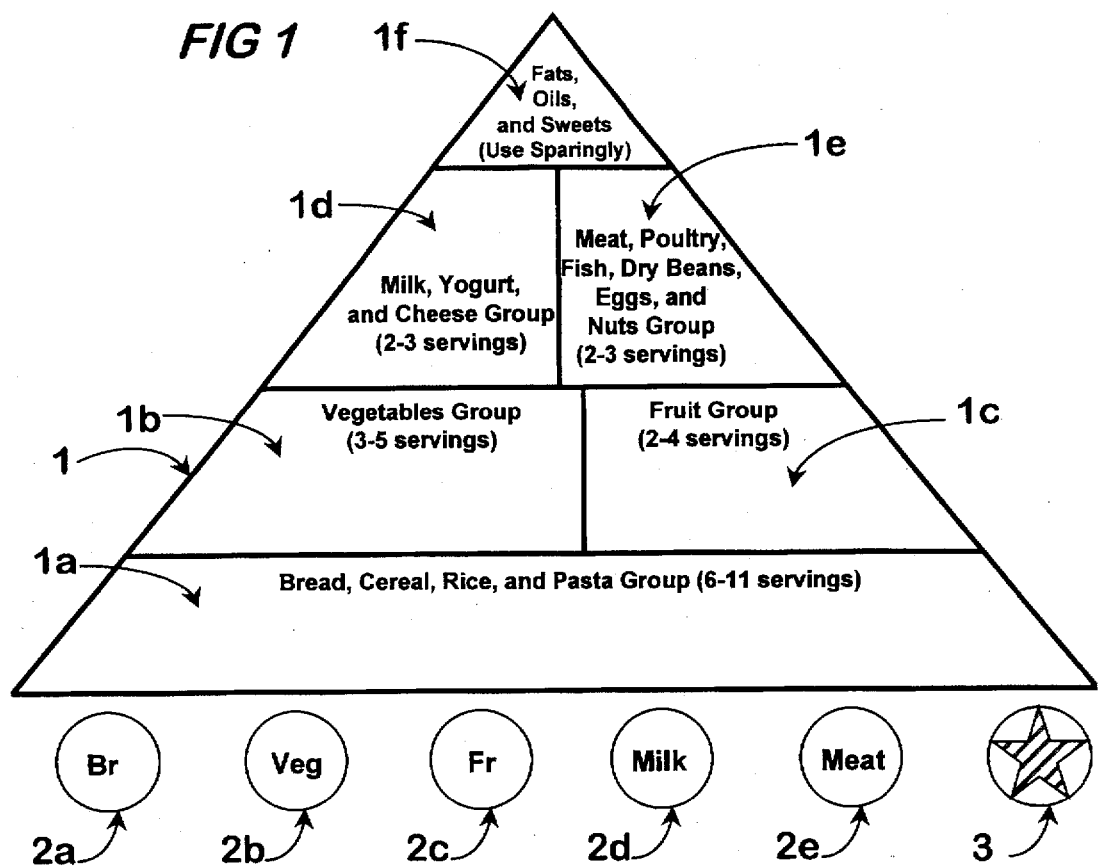
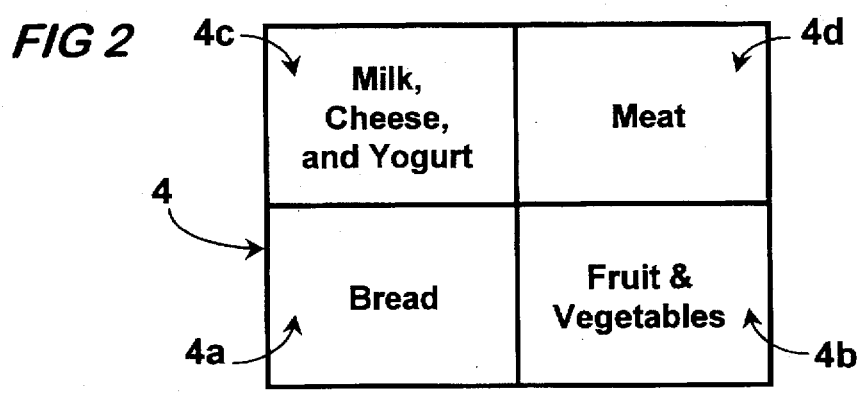

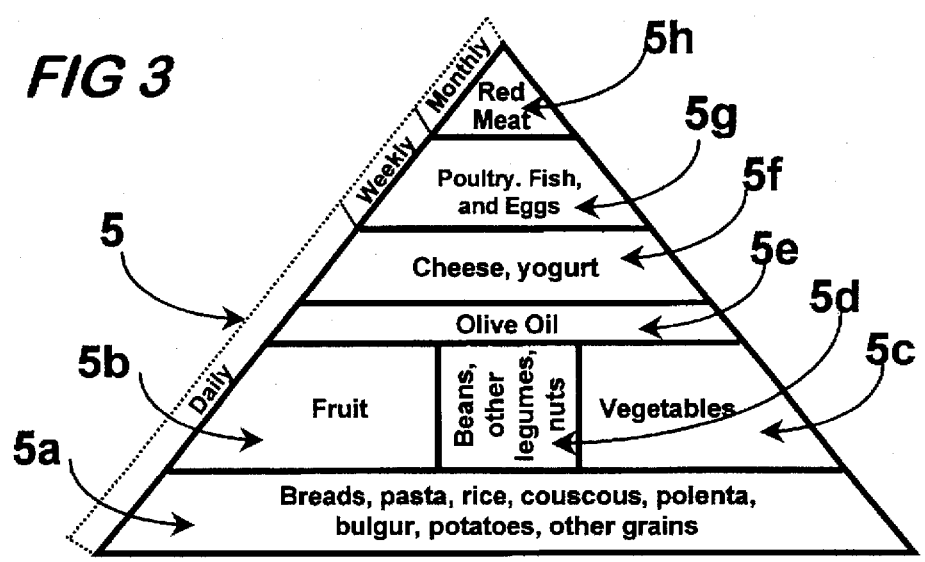
FIG 3
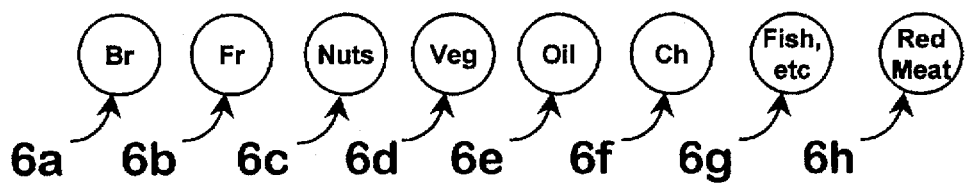
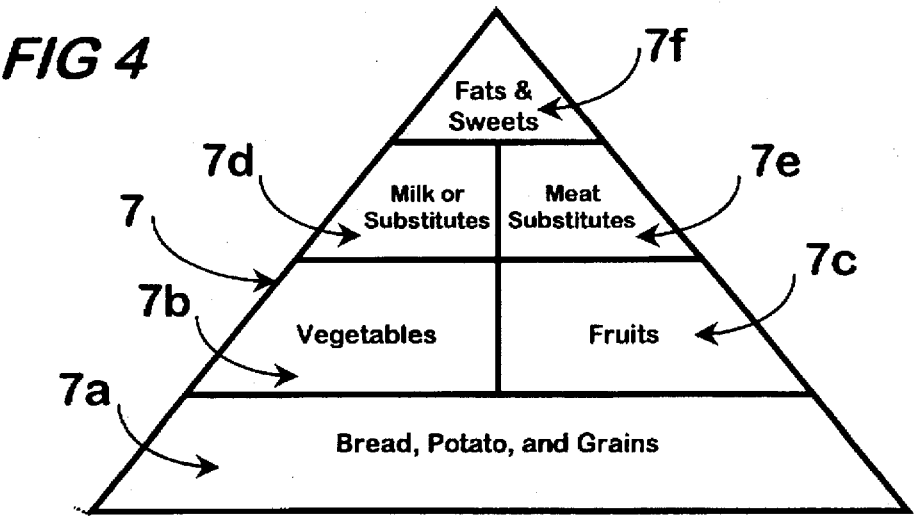
FIG 4
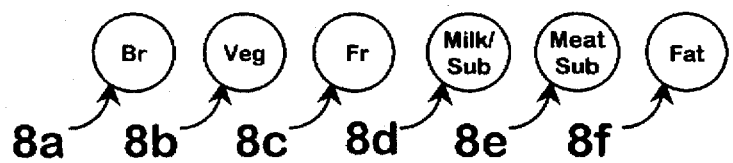

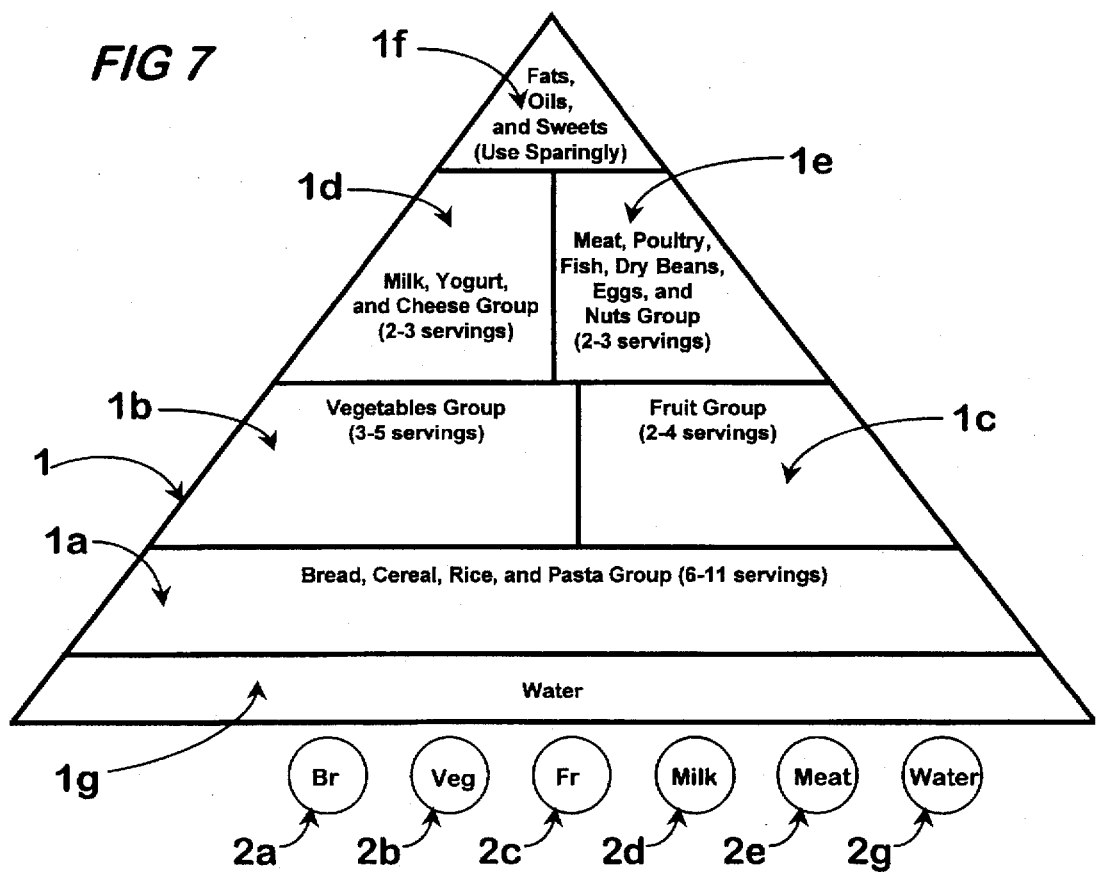

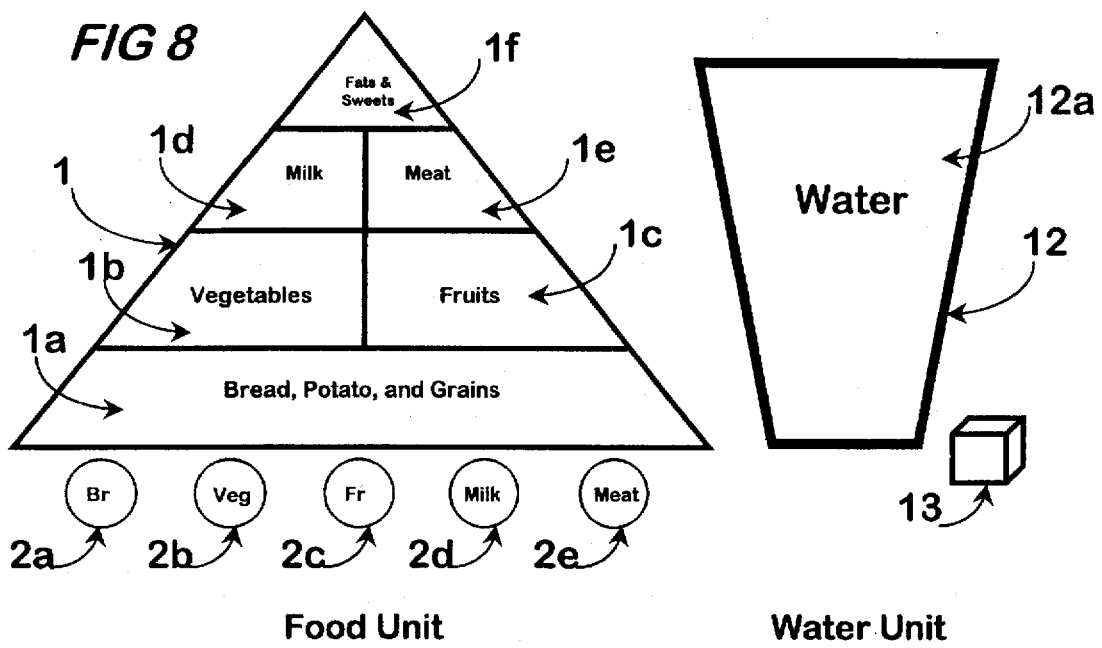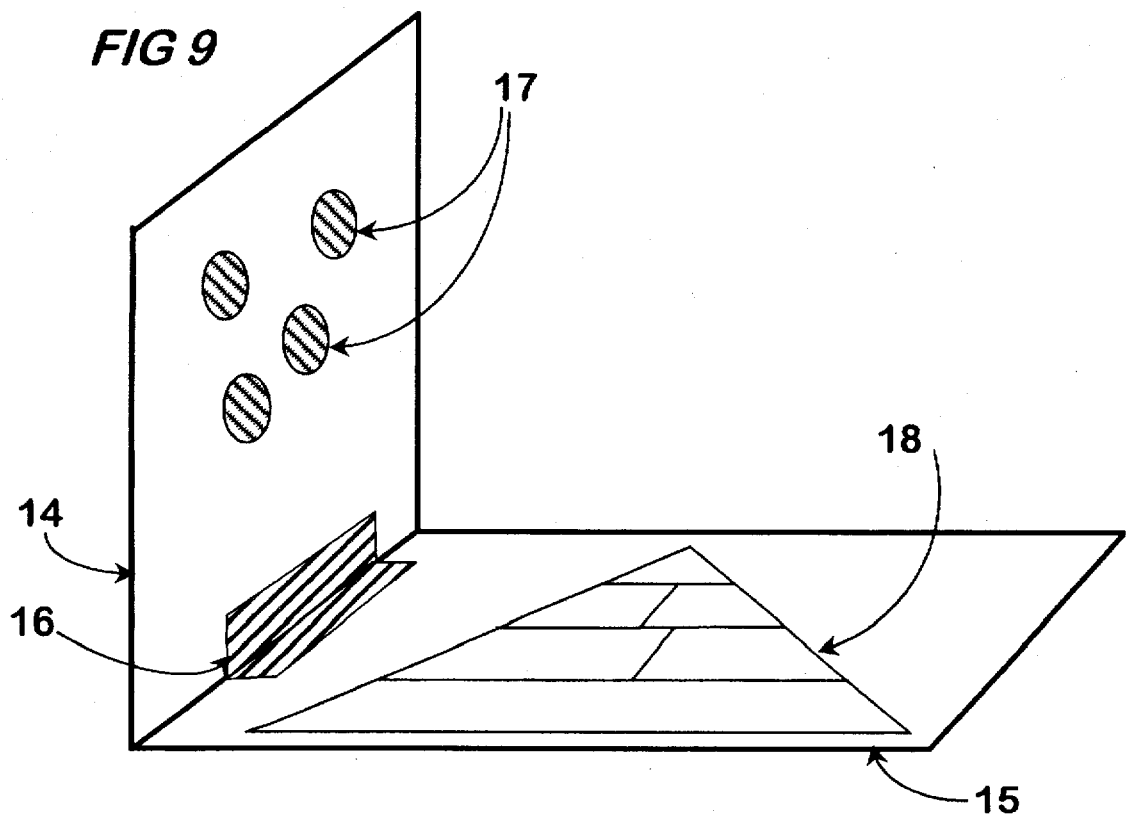

5,683,251

SYSTEM AND METHOD FOR TRACKING DIETARY CONSUMPTION

FIELD OF THE INVENTION

The invention relates to a device for teaching children about proper nutrition. More specifically, the device is intended to train children to consume a predetermined number of servings from each member of a predetermined set of food groups.

BACKGROUND OF THE INVENTION

Based upon published scientific studies and U.S. government literature, it is clear that a balanced daily intake of various food elements is beneficial. The benefits of a balanced diet include:

a) Human Productivity Enhancement. Maintenance of an individual's metabolic rate at a level which allows him to effectively perform physical and/or mental tasks is directly related to dietary balance.

b) Chronic Disease Avoidance. Regular consumption of a balanced diet reduces the risk of cancer, heart disease, diabetes, and strokes.

c) Prevention or Reduction of Osteoporosis. A balanced diet slows loss of calcium from bones and teeth.

d) Weight Control. These benefits individually and collectively define training of individuals to regularly consume a balanced diet as a non-trivial undertaking with significant economic benefit.

For many years, the U.S. government, foreign governments, and various food companies have conducted research directed toward dividing available food and beverage items among a plurality of food groups, and determining how many food and beverage items should be consumed from each food group on a daily basis to ensure balanced nutrition. Current thought among most U.S. health professionals is that food items can be divided among the following food groups:

a) the bread, cereal, rice, and pasta group (hereinafter referred to as the bread or cereal group);

b) the vegetable group;

c) the fruit group;

d) the milk, yogurt, and cheese group;

e) the meat, poultry, fish, dry beans, eggs, and nuts group (hereinafter referred to as the meat group); and f) the fats and sweets group.

To insure balanced nutrition, each day an individual should consume from six to eleven servings from the bread or cereal group; from three to five servings from the vegetable group; from two to four servings from the fruit group; from two to three servings from the milk, yogurt, or cheese group; and from two to three servings from the meat group. Foods from the fats and sweets group should be consumed sparingly. Also, from eight to ten 8-ounce servings of water or a similar non-dairy beverage should be consumed each day.

The above-described system of classifying food items has been graphically illustrated on the well-known Food Guide Pyramid. The Food Guide Pyramid takes the form of a triangle which has been divided into six regions, with each region representing a different food group. The size of a given region is roughly dependent on the number of servings of foods belonging to the food group represented by that region which should be consumed in a day. Thus, the region corresponding to the bread or cereal group is the largest region of the Food Guide Pyramid, and the region corresponding to the fats and sweets group is the smallest region.

Of course, the above system is only one possible system of classifying food items. Other systems are possible, and may be used. For example, vegetarians may choose to omit the meat group, and replace it with a group containing beans and nuts. Similarly, the milk, yogurt, and cheese group may be replaced with a group containing soy-based milk substitutes. In another possible system, fruits and vegetables may be included in a single group.

Graphic representations of a system of classifying food items, such as the Food Guide Pyramid, are static representations which have pictures and/or text defining the food groups and their member food elements. While such graphic representations have their place as a teaching device, they do not necessarily facilitate an individual's efforts to accurately track his or her daily food consumption. It would be desirable to have a device which calls for an individual to perform an action which records that he has consumed an item of food from a given food group each time an item of food is consumed. This device should allow the individual to tell at a glance how many items of food from each food group have been eaten on a given day.

More specifically, the device should provide the following elements:

a) identification of a dietary goal;

b) a means to understand what elements satisfy the dietary goal; and c) a means to record progress toward attainment of the dietary goal.

A graphic representation of the Food Guide Pyramid or a related system for classifying foods can successfully define a dietary goal, where this goal is to consume a balanced diet comprising food items from each member of a defined set of food groups. Similarly, such representations can provide a means to understand what elements satisfy the dietary goal by defining what food items belong to each food group, and how many items from each food group must be consumed to fulfill the goal of consuming a balanced diet.

However, such representations fail to provide a means to record progress toward attainment of the dietary goal. All the elements of a balanced diet should be consumed, not at one time, but instead over the course of several meals throughout the day. It is therefore advisable to develop a system which allows for continuous tracking of food consumption over the course of a day as a means to record progress toward attainment of the dietary goal. This is particularly important if the system is used by small children, who may have difficulty with carrying out the detailed advance planning required to set out a diet that will meet an assigned dietary goal for a given day.

In the prior art, there are a number of devices that attempt to aid an individual in recording progress toward attainment of a dietary goal. For example, U.S. Pat. No. 4,652,241, issued to McCarty on Mar. 24, 1987, discloses a system comprising a plurality of tokens, where each token corresponds to a single predefined portion of a food selected from a specific food group, and a food consumed display zone. Each time a food item is consumed, a token corresponding to a portion of food from the food group to which that food item belongs is positioned on the food consumed display zone. By counting the number of tokens corresponding to portions of food from a defined food group on the food consumed display zone, one can tell whether the desired number of food items from that food group has been eaten. However, this system has the drawback that the food consumed display zone is not divided into regions which correspond to defined food groups. This means that, in order to count the number of tokens corresponding to a defined food group, an individual must determine which tokens in the food consumed display zone correspond to the defined food group and which tokens correspond to all other food groups. This extra step increases the individual's chance of miscounting tokens, which may in turn lead to accidental consumption of an unbalanced diet. The chance of a mistake in counting is particularly great if the system is to be used by a small child. Further, there is little motivation for a small child to use this device, so that it is of limited utility in teaching children to eat a balanced diet.

Similarly, U.S. Pat. No. 4,832,603, issued to Basil on May 23, 1989, discloses a system comprising a plurality of tokens, where each token corresponds to a single predefined portion of a food selected from a specific food group, and a food consumed display zone. However, the food consumed display zone is divided into several zones, with each zone corresponding to one of several meals eaten over a 24-hour period. Each of these meal zones is used to record a menu for that meal. This system is used more for advance planning of a daily menu than for recording food consumption as it occurs throughout the day. Thus, this system does not really record incremental progress toward the goal of consuming a balanced diet throughout the day. Also, as previously noted, the kind of advanced planning required to use this system is difficult for very young users.

A first object of the invention is to provide a system of continuously tracking consumption of food items from each of several food groups as they are consumed throughout the day.

A second object of the invention is to develop a food consumption tracking system which allows the user to tell at a glance how many items from each of a plurality of food groups have been consumed on a given day, and which is simple enough that a small child can use it easily and accurately.

A third object is to develop a food consumption tracking system which will teach young children to eat a balanced diet without requiring them to plan daily or weekly menus, and will further cause young children to become excited about eating a balanced diet.

SUMMARY OF THE INVENTION

The present invention comprises a system for tracking consumption of food items from each of a plurality of food groups through user-defined period of time, typically a 24-hour period. This system also serves as a device for teaching children about good nutrition, and training children to eat a balanced diet on a daily basis. The invention comprises a board and a plurality of tokens adapted to stick to the board. The plurality of tokens comprises a minimum of two types of tokens, where these two types of tokens comprise:

a) a predetermined number of first tokens, each of said first tokens corresponding to a single portion of a food or beverage item selected from a first specific food group; and b) a predetermined number of second tokens, each of said second tokens corresponding to a single portion of a food or beverage item selected from a second specific food group. Ideally, the predetermined number of first tokens corresponds to the number of food or beverage items from the first food group to be consumed in a 24-hour period; and the predetermined number of second tokens corresponds to the number of food or beverage items from the second food group to be consumed in a 24-hour period.

The board provided with the food consumption tracking system is divided into at least two regions. These regions comprise: p1 a) a first region which is labelled as corresponding to the first specific food group; and b) a second region which is labelled as corresponding to the second specific food group.

Each of said first tokens corresponding to a single portion of a food or beverage item selected from the first specific food group is adapted to be moved onto the first region of the board, allowing an individual to easily record consumption of a portion of food or beverage from said first specific food group. Similarly, each of said second tokens corresponding to a single portion of a food or beverage item selected from the second specific food group is adapted to be moved onto the second region of the board, allowing an individual to easily record consumption of a portion of food or beverage from said second specific food group. An appropriate token is moved onto either the first or second region of the board each time a portion of food or beverage from either the first or second food group is consumed, allowing an individual to track consumption of foods from the first food group and from the second food group throughout a 24-hour period.

If desired, the system can be expanded to include additional groups of tokens, where each token in each additional group of tokens corresponds to a food or beverage item from an additional food group. It must be noted that if additional types of tokens are included, the board must contain an equal number of additional regions, where each additional region is labelled as corresponding to one of the additional food groups. Thus, if a food from a specified food group other than the first food group or the second food group is eaten, a token corresponding to a serving of food from a specified food group other than the first food group or the second food group may be taken and placed on a region of the board which corresponds to a specified food group other than the first food group or the second food group. Thus, consumption of foods from any number of food groups can be tracked on a daily basis.

As previously noted it is anticipated that this device will be used to teach small children to eat a balanced diet. To this end, it is intended that this system will be designed so that it is attractive to children so that they will want to use it. One way to accomplish this is to provide tokens which are colorful. Each token may take the form of a disk which has a colorful picture of a food item from the food group represented by the token on a first side of the disk, and a means for sticking the disk to the board on the other side of the disk. Alternatively, each token may be shaped like the food item depicted on its first side, rather than being shaped like a disk.

As an additional motivation for a child to use the food consumption tracking system, a single reward token may be provided. After each area of the board is filled with a predetermined number of tokens, indicating that the child has eaten a desired number of foods from each food group, the reward token may be placed on the board. This reward token thus indicates that the child has achieved the goal of eating a balanced diet for that 24-hour period.

DESCRIPTION OF THE DRAWINGS

FIG. 1 shows a first embodiment of a Food Consumption Tracking System designed in accordance with U.S. government nutritional guidelines.

FIGS. 2 shows a user-defined variant of the Food Consumption Tracking System.

FIGS. 3 and 4 show Food Consumption Tracking Systems designed in accordance with nutritional guidelines or restrictions from sources other than the U.S. government.

FIGS. 7 and 8 show different embodiments of a Food and Water Consumption Tracking System.

FIG. 9 shows a Food Consumption Tracking System having a means for storing tokens when not in use.

DETAILED DISCLOSURE

Figure 5:
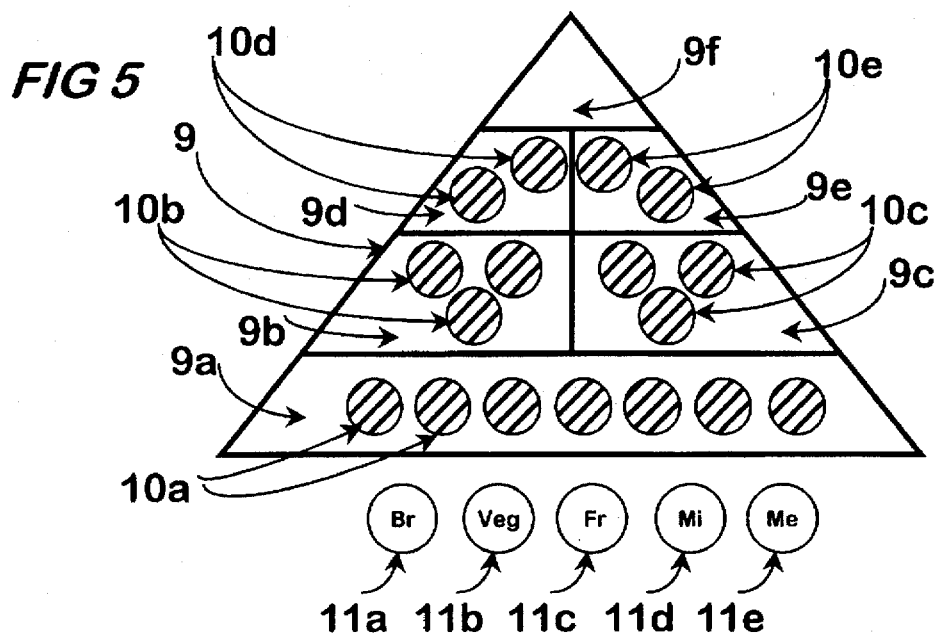
FIGS. 5 and 6 relate to a second embodiment of a Food Consumption Tracking System designed in accordance with U.S. government nutritional guidelines. This second embodiment is designed in the form of a puzzle.

A preferred embodiment of the Food Consumption Tracking System is illustrated in FIG. 1. This embodiment comprises a board 1 which is divided into a plurality of regions, where each of these regions corresponds to a particular food group. In the board shown in FIG. 1, the board is divided into:

a) a first region 1a, corresponding to the bread or cereal group;

b) a second region 1b, corresponding to the vegetables group;

c) a third region 1c, corresponding to the fruit group;

d) a fourth region 1d, corresponding to the milk, yogurt or cheese group;

e) a fifth region 1e, corresponding to the meat group; and f) a sixth region 1f, corresponding to the fats and sweets group.

As shown in the figure, the board is in the shape of a triangle, with the six regions being distributed on the board in accordance with the distribution of the food group regions in the well-known Food Guide Pyramid. If desired, each food group region on the board may be labelled with text which indicates which food group is represented by that region, and how many items from that food group should be eaten each day, as shown in FIG. 1. Please note that, although the text is in English in the Figure, this is not a requirement of the system; the text may be printed in Spanish, French, or a variety of other languages to facilitate use of the tracking system by people from non-English speaking cultures. Alternatively, to facilitate understanding of the meaning of each region of the board by young children who may not be able to read, each food group region on the board may have pictures of food from the food group represented by that region of the board printed thereon, instead of text. This additionally assists in teaching children what foods are grouped together in a single group. For example, the child may see a picture of a carrot and a picture of an ear of corn together in the second region of the board, allowing him to recognize that, although corn and carrots look different, they are both vegetables. Similarly, if the child sees a carrot and a banana pictured in different regions of the board, he will recognize that they belong to different food groups.

The invention additionally comprises a plurality of tokens 2, where each token represents a single serving of food from a specific food group. In the embodiment of the invention shown in FIG. 1, the following tokens are provided:

a) a set of tokens 2a which each correspond to a single serving of a food selected from among the foods belonging to the bread or cereal group;

b) a set of tokens 2b which each correspond to a single serving of a food selected from among the foods belonging to the vegetable group;

c) a set of tokens 2c which each correspond to a single serving of a food selected from among the foods belonging to the fruit group;

d) a set of tokens 2d which each correspond to a single serving of a food selected from among the foods belonging to the milk, yogurt or cheese group; and e) a set of tokens 2e which each correspond to a single serving of a food selected from among the foods belonging to the meat group.

The number of tokens in a set of tokens will normally be selected to correspond to the number of servings that the U.S. government says a person should eat from the food group represented by that set. Thus, since federal guidelines say that a person should eat from six to eleven servings of bread or cereal each day, from six to eleven tokens 2a will be provided. For similar reasons, from three to five tokens 2b, from two to four tokens 2c, from two to three tokens 2d, and two to three tokens 2e will be provided. However, if desired for reasons of personal preference or for medical reasons, the number of tokens in each group may be chosen to lie outside of these limits. It should be noted that tokens corresponding to servings of food from the fats and sweets group are not provided. This is because, according to U.S. federal guidelines, consumption of fats and sweets should be avoided and not encouraged. However, fats and sweets tokens may be provided if an individual wishes, for medical or other reasons, to track fats or sweets consumption.

To facilitate identification of a token as corresponding to a desired food group, each token must be clearly labelled. This may be done with text, as shown in FIG. 1. Thus, a token 2a is labelled "bread"; a token 2b is labelled "vegetable"; and so on. As with text labels on the board, this may be done with a variety of different languages. Alternatively, the tokens may be color-coded, with each set of tokens having a different color. Thus, a token 2b corresponding to the vegetable group may be colored green, while a token 2e corresponding to the meat group may be colored red. As a third option, a picture of a food may be printed on each token, where the food depicted is a member of the food group represented by that token. A token 2c may have a picture of an apple or an orange printed thereon, while a token 2a may have a picture of a loaf of bread printed thereon. Finally, each type of token having a surface which is distinguishable by touch from that of each other type of token. For example, the tokens may be marked with Braille symbols.

Use of color-coding or pictures to identify tokens is preferred, as they are easy for a child who may use the system to understand. The tokens may be disk-shaped, as shown in FIG. 1, or they may be shaped like a food from the food group which they represent (i.e., a vegetable group token may be shaped like a carrot). If a token is shaped like a food item, it is preferred that it has a picture of that food item printed thereon. If the system is to be used by small children, it is preferred that each token be disk-shaped, with a minimum diameter of 1¼ inches.

The board 1 is preferably made of a sheet of flexible material which is adapted to stick to a vertical surface. More preferably, the board is adapted to stick magnetically to a vertical metal surface, such as a refrigerator door. Such a board may be made of a sheet of flexible plastic which has a design representing a system of food classification printed on its front side, and a coating of magnetic material laminated to the other side. Alternatively, the board may be made of a sheet of rigid material, such as metal. Such a rigid board will preferably have a hook or other means to hang the board from a support on its reverse side.

The tokens 2 are preferably made of flat pieces of flexible material which are adapted to stick to the board 1. Most preferably, the tokens are made of flat sheets of plastic having a magnetic material laminated to one side. Such tokens are able to stick magnetically to the front side of a board having a magnetic material on its reverse side, or to a board made of a metal sheet. The other side of each tokens may be printed with text or pictures which identify the tokens as representing a specific food group.

Other embodiments of the tokens may be envisioned. For example, the layer of magnetic material may be replaced with a layer of a reusable polymeric adhesive. Another possibility is that a sheet of plastic which is capable of holding a static electrical charge may be used as a token. Such tokens may be used with a board 1 having a layer of dielectric material on its front surface. Such a token may then cling electrostatically to the board, much in the manner of the well-known product Colorforms (™).

Also, the tokens may be made with a layer of fabric having a plurality of protruding nylon hooks laminated to one side. If this option is used, the front of the board must have a layer of fabric having a plurality of protruding nylon loops laminated thereto. The token may be fastened to the board by placing the layer of fabric on the tokens in contact with the layer of fabric on the board so that the hooks reversibly engage the loops. Such fabrics are sold under the trade name Velcro (™). Other means for adhering tokens to the board may be envisioned; those previously described should be construed as non-limiting examples.

In operation, the food consumption tracking system works as follows. Each time an individual using the system takes an item of food or drink, he determines to which food group that item belongs. He then takes a token corresponding to an item of food or beverage from that food group, and places that token in the region of the board which corresponds to that food group. For example, if a single serving of bread is eaten by the individual, he takes one of the tokens 2a, corresponding to a serving of bread or cereal, and places it in bread or cereal region 1a of the board. If multiple servings of food from a single food group are eaten at one time, multiple tokens corresponding to an item of food or beverage from that food group should be placed in the region of the board which corresponds to that food group. Over a 24-hour period, the individual should be able to see at any given time how many items he has consumed from each food group thus far that day. This also makes it possible for him to tell whether he has met a goal of eating a defined number of foods from each of the major food groups at the end of the day.

As an incentive to reach this goal, an optional reward token 3, pictured in FIG. 1, may be provided. This is of particular utility in inspiring a child, who may not fully understand the benefits of a well-balanced diet, to use the system. When each of regions 1a, 1b, 1c, 1d, and 1e is filled with a desired number of tokens, indicating that the child has eaten a desired number of foods from each food group, the reward token may be placed on the board as a record of achievement. This makes the food consumption tracking system seem like a game, where the object is to earn the reward token. Construction of the reward token may be similar to construction of tokens 2.

As illustrated in FIG. 1, the Food Consumption Tracking System is adapted to fit current U.S. government guidelines as to what must be eaten each day to ensure consumption of a healthy diet. However, the tracking system is flexible enough to allow for tracking systems which may be defined to correspond to the individual user's dietary needs and preferences. Boards, which may or may not be triangular, may be provided which comprise a plurality of regions which may be rearranged and/or relabelled by the user, or by the manufacturer at the user's request. For example, FIG. 2 depicts a rectangular board 4 which is divided into four user-defined food group regions. These regions include a breads and cereals region 4a; a vegetables and fruits region 4b; a milk, yogurt and cheese region 4c; and a meat region 4d. Since only four food groups are present, only four types of tokens will be needed. Beyond these changes, use of a tracking system comprising board 4 will be essentially the same as the use of a tracking system comprising board 1.

The arrangement, number, and definition of food group regions on the board, as well as the shape of the board itself, may also be changed by the manufacturer over time. This is useful because the dietary guidelines issued by the U.S. government may change over time. Thus, at some future date, the Food Guide Pyramid depicted on the board in FIG. 1 may no longer reflect these guidelines. The regions on the board may then be rearranged and/or relabelled to reflect these new guidelines.

This flexibility is also advantageous in that it allows us to design a system for use in other countries which use dietary guidelines which differ from the U.S. guidelines. For example, FIG. 3 illustrates a board 5 which may be used in Mediterranean countries. Board 5 is a simplified representation of the Mediterranean Food Pyramid. Board 5 is divided into following food groups:

a) the bread, potato, or grains group 5a;

b) the fruit group 5b;

c) the vegetable group 5c;

d) the nuts and beans group 5d;

e) the olive oil (fat) group 5e;

f) the cheese and yogurt group 5f;

g) the fish, poultry, and eggs group 5g; and h) the red meat group 5h.

Thus, more food groups are present in the modified Mediterranean board, and the emphasis placed on the food groups is changed. According to Mediterranean guidelines, consumption of red meat is to be avoided, while a defined number of portions of fat should be consumed. Therefore, a Food Consumption Tracking System for use in Mediterranean countries should contain the following seven sets of tokens 6:

a) a set of tokens 6a which each correspond to a single serving of a food selected from among the foods belonging to the bread, potato, or grains group;

b) a set of tokens 6b which each correspond to a single serving of a food selected from among the foods belonging to the fruit group;

c) a set of tokens 6c which each correspond to a single serving of a food selected from among the foods belonging to the vegetable group;

d) a set of tokens 6d which each correspond to a single serving of a food selected from among the foods belonging to the nuts or beans group;

e) a set of tokens 6e which each correspond to a single serving of a food selected from among the foods belonging to the olive oil group;

f) a set of tokens 6f which each correspond to a single serving of a food selected from among the foods belonging to the yogurt or cheese group; and g) a set of tokens 6g which each correspond to a single serving of a food selected from among the foods belonging to the fish, poultry, or eggs group. Although tokens for the red meat group 6h may be provided, consumption of red meats is discouraged and so these tokens may be left out of this embodiment of the invention.

Systems adapted to individual dietary needs may also be developed and sold. For example, FIG. 4 illustrates a board 7 and tokens 8 which may be used by vegetarians. This board 7 comprises six regions:

a) a first region 7a, corresponding to the bread, potato, or grains group;

b) a second region 7b, corresponding to the vegetables group;

c) a third region 7c, corresponding to the fruit group;

d) a fourth region 7d, corresponding to the milk, yogurt, cheese and/or soy-based milk substitutes group;

e) a fifth region 7e, corresponding to the nuts, beans, and meat substitutes group; and f) a sixth region 7f, corresponding to the fats and sweets group.

Similarly, six types of tokens are provided with board 7:

a) a set of tokens 8a which correspond to a single serving of a food selected from among the foods belonging to the bread, potato, or grains group;

b) a set of tokens 8b which correspond to a single serving of a food selected from among the foods belonging to the vegetable group;

c) a set of tokens 8c which correspond to a single serving of a food selected from among the foods belonging to the fruit group;

d) a set of tokens 8d which correspond to a single serving of a food selected from among the foods belonging to the milk, yogurt, cheese and/or soy-based milk substitutes group;

e) a set of tokens 8e which correspond to a single serving of a food selected from the nuts, beans, and meat substitutes group; and f) a set of tokens 8f which correspond to a single serving of a food selected from the fats and sweets group. Tokens 8f are provided because vegetarians must consume a defined number of servings of fat daily, unlike non-vegetarians who eat according to the Food Guide Pyramid shown in FIG. 1. With the exception that fat and sweet consumption is explicitly tracked, this embodiment of the invention is used in the same manner as that in FIG. 1.

A different embodiment of the Food Consumption Tracking System is illustrated in FIG. 5. This embodiment comprises a board 9 which is divided into a plurality of regions, where each of these regions corresponds to a particular food group. A plurality of holes 10 extend partially or completely through the board. In the board shown in FIG. 5, the board is divided into:

a) a first region 9a having a plurality of holes 10a therethrough, corresponding to the bread or cereal group;

b) a second region 9b having a plurality of holes 10b therethrough, corresponding to the vegetables group;

c) a third region 9c having a plurality of holes 10c therethrough, corresponding to the fruit group;

d) a fourth region 9d having a plurality of holes 10d therethrough, corresponding to the milk, yogurt or cheese group;

e) a fifth region 9e having a plurality of holes 10e therethrough, corresponding to the meat group; and f) a sixth region 9f, corresponding to the fats and sweets group. The number of holes in each region corresponds to the number of servings from the food group represented by that region a person should eat each day.

The embodiment in FIG. 5 further comprises a plurality of pieces, including:

a) a set of pieces 11a which are adapted to fit into holes 10a, where each piece 11a corresponds to a single serving of a food selected from among the foods belonging to the bread or cereal group;

b) a set of pieces 11b which are adapted to fit into holes 10b, where each piece 11b corresponds to a single serving of a food selected from among the foods belonging to the vegetable group;

c) a set of pieces 11c which are adapted to fit into holes 10c, where each piece 11c corresponds to a single serving of a food selected from among the foods belonging to the fruit group;

d) a set of pieces 11d which are adapted to fit into holes 10d, where each piece 11d corresponds to a single serving of a food selected from among the foods belonging to the milk, yogurt or cheese group; and e) a set of pieces 11e which are adapted to fit into holes 10e, where each piece 11e corresponds to a single serving of a food selected from among the foods belonging to the meat group.

This system is designed in the form of a puzzle, and is intended to be used by a child. The child uses the system in much the same manner as the previously described systems. Each time he eats a food item, he takes a piece which corresponds to the food group to which that item belongs. He then fits that piece into a hole in the appropriate region of the board. For example, if the child eats a single-serving slice of bread, he takes a piece a and fits it into a hole 10a in board 9. The child solves the puzzle by placing a piece in each hole 10. In order to do this, he must eat a balanced diet that day by consuming a defined number of items in each food group, where the defined number of items is equal to the number of holes in the region of the board which corresponds to that food group. The child's desire to solve the puzzle helps provide motivation to consume a balanced diet.

The board 9 can be made from the same materials previously described as being useful for board 1. Similarly, pieces 11 can be made of materials used for tokens 2. However, the board 9 and the pieces 11 can also be made of wood or cardboard. It is strongly preferred that each piece be the same shape as the hole into which it is adapted to fit. All pieces and holes may be the same shape, although this is not necessary. A different shape may be used for each set of pieces and its associated holes. For example, holes 10a and pieces 11a may be square; holes 10b and pieces 11b may be round; holes 10c and pieces 11c may be hexagonal; and so on. Using pieces having different shapes in this manner makes it possible to use the tracking system to teach spacial relationships as well as nutrition.

Each piece 11 is flat, with a front face and a back face. If desired, each piece can be identified as to the food group it represents with a block of text which is printed on its front side, as shown in FIG. 5. However, it is preferred that a picture of a food selected from the food group represented by a given piece be printed on the front face of the piece. This makes the piece more appealing to children, increasing the likelihood that they will want to use the tracking system.

Each piece 11 may alternatively have a portion of a selected large picture printed on its front face, and a block of text or a picture of a food which identifies the food Group to which that piece corresponds on its rear face. The board 9 may have the selected large picture printed on its front face, with the proviso that a gap in the large picture on the board exists at the site of each hole 10. A grid dividing the picture on the board into a plurality of food Group regions 9a, 9b, 9c, 9d, 9e, and 9f should be incorporated into or overlaid on the picture. Any type of picture may be used on the face of the puzzle, including photographs, paintings or cartoons. In keeping with the subject of the invention, it is, however, preferred that the pictures be food related.

The portion of the picture on the front of any given piece 11 is chosen so that, when the piece is placed in an appropriate hole 10 with its front face uppermost, one of the gaps in the large picture on the board is filled in. When a child eats an item of food from a given food group, he uses this version of the tracking system by looking at the identifying text or picture on the back of each piece 11 until he identifies a piece that corresponds to the given food group. He then places the piece, front side uppermost, in a hole 10 in the region of the board which corresponds to the given food group. The child must take care, not only that the piece fits into the hole properly, but also that the portion of the picture on the front of the piece 11 which he has selected corresponds to the portion of the picture surrounding the hole into which he has placed the piece. When the child has eaten a defined number of foods from each food group, all of the holes 10 in the board 9 will have been filled in, and the complete picture will become visible.

Figure 6:
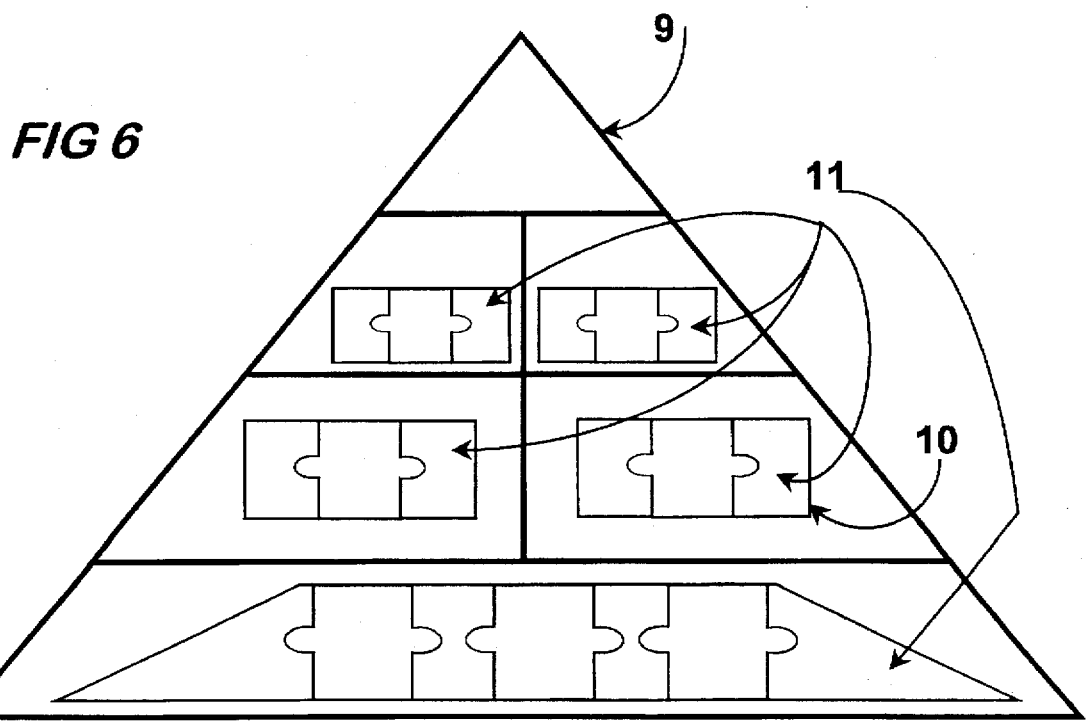

If desired, only a single large hole 10 may be present in each region of the board 9. In this case, a single hole 10 in a defined food group region of the board may be filled in with a plurality of interlocking pieces 11, in the manner of a jigsaw puzzle. This embodiment is illustrated in FIG. 6.

If desired, the system can be altered to allow tracking of water consumption as well as food consumption. FIG. 7 shows a system comprising a modified board 1 which, in addition to food group regions 1a, 1b, 1c, 1d, 1e, and 1f, has a seventh region 1g labelled as corresponding to water. A set of tokens 2g are provided, along with the previously described tokens 2a, 2b, 2c, 2d, and 2e. Each token 2g corresponds to a single serving of water or another non-dairy beverage. Preferably, each token 2g is a) shaped like a flat square or hexagon, and with a picture of an ice cube printed on its front surface, or b) shaped like a disk, with a picture of a raindrop printed on its front surface. However, tokens 2g may be shaped like disks, or labelled with text rather than with pictures, if desired. Water consumption is tracked in the same way that food consumption is tracked. Each time an individual drinks a serving of water, a token 2g is placed in region 1g of the board. Then, at the end of the day, the individual can count the tokens in region 1g of the board to determine whether he has consumed a desired number of servings of water that day.

Consumption of water can also be tracked on a separate board from food consumption. FIG. 8 shows a system comprising a board 1 is divided into food group regions 1a, 1b, 1c, 1d, 1e, and 1f, and a board 12 which comprises a single region 12a labelled as corresponding to water. A set of tokens 13 are provided, along with the previously described tokens 2a, 2b, 2c, 2d, and 2e. Each token 13 corresponds to a single serving of water or another non-dairy beverage. Water consumption is tracked using a two-board system in the same way that water consumption is tracked using a single-board system. Each time an individual drinks a serving of water, a token 13 is placed in region 12a of the board 12. Then, at the end of the day, the individual can count the tokens in region 12a of the board 12 to determine whether he has consumed a desired number of servings of water that day. Meanwhile, tokens 2 are placed on board 1 to track food consumption in the same manner as previously described. While board 1, board 12, tokens 2, and tokens 13 may be sold together as a unified system for tracking food and water consumption, a water consumption tracking system comprising board 12 and tokens 13 may be sold separately from a food consumption tracking system comprising board 1 and tokens 2.

A food consumption tracking system for use by travellers may also be envisioned. As shown in FIG. 9, two boards 14 and 15 constructed of a steel sheet or other magnetic material may be connected with a hinge 16 on one side so that they may be folded together. A means for fastening the two boards together, such as a velcro closure or a snap, is provided so that the boards may be maintained in a folded position. Tokens 17 representing portions of food are fastened magnetically on a first of the two boards, and a chart 18 having regions displaying the food groups, such as the Food Guide Pyramid, is printed on the second board. Each time a traveller consumes a food item from a specified food group, he removes a token corresponding to a serving of food from that food group from the first board and fastens it magnetically to the appropriate region of the chart on the second board.

If desired, the system may be designed to monitor intake of calories, fat, cholesterol, protein and/or other nutrients over a 24-hour period, rather than servings of foods. If this is done, the board may be divided into a plurality of regions, one of which corresponds to fat intake and the other of which corresponds to calorie intake. Other areas may correspond to cholesterol intake, protein intake, etc. In use, after consumption of a food containing a defined number of calories, a token or tokens representing that number of calories may be placed in the calorie intake region of the board. A token or tokens representing the number of grams of fat in that food are placed on the fat intake region of the board. Since the number of calories in each gram of fat is known, this embodiment makes it easy for an individual to determine what percentage of his calorie intake in a given day comes from fat. This is useful because, in a healthy diet, less than 30% of calories should come from fat.

A similar system may be used to monitor intake of medications over a defined period of time. The board may be divided into a plurality of regions, each of which corresponds to a different drug. A set of tokens may be provided for each drug being taken by a patient. Each time a dose of a given medication is taken, a token corresponding to that medication is placed in a region of the board corresponding to that medication. If it is known how many doses should be taken by a given time, inspection of the number of tokens on the board provides information as to whether any doses have been missed.

Tracking systems may also be used for monitoring other activities. For example, the board may be broken down into regions which each represent a physical or mental activity, task, or goal to be performed a certain number of times in a defined period of time (i.e., a 24-hour period, a one-week period, etc.), and the tokens may each represent a single time that one of the activities, tasks, or goals represented by a region on the board is performed or accomplished. Examples of these activities, tasks, or goals may be:

a) a defined sports activity, performed a defined number of times or for a given duration (i.e., a 20-minute bicycle ride, a three-mile jog, 25 push-ups, etc.);

b) completion of a defined number of exercises or a defined amount of work in an academic subject area (i.e., 25 mathematics problems, one English essay, reading two chapters from a history text, etc.); and c) household tasks (sweeping, vacuuming, washing dishes, etc.). Other possibilities may be envisioned.

For example, if an individual wants to monitor completion of desired sports activities, each time the individual completes one defined sports activity, he places one token corresponding to that activity in a region of the board corresponding to that activity. If an activity is performed for longer than the given duration, more than one token may be placed on the board at the same time. Thus, each time the individual rides his bicycle for 40 minutes, he may take two tokens which each represent a single 20-minute bicycle ride and place them in a region of the board which corresponds to bicycle riding.

Although the detailed disclosure given above describes several possible embodiments of the invention, these are merely presently preferred embodiments. Other embodiments may be envisioned. For example, in the case of the food consumption tracking system, if nutritionists, educators, and/or child-rearing specialists determine that use of a triangular Food Guide is less desirable than use of a Food Guide in a different geometric shape, the shape of the board used in the invention can be changed so that it corresponds to the then-accepted shape. In addition, the invention may be easily produced in more portable forms, including incorporation of a representation of the board and one or more sets of adhesive tokens into daily journals and calendar books, without substantial impact to the format, components, and operation of the tracking system.

Just as important, and as previously discussed, the representation of the food guide on the board and the distribution of tokens used in this invention may be changed to reflect regional or national differences in language, customs, or dietary preferences.

Further, the flexible nature of the current invention allows a user to self-define time periods and determine the number of tokens required to meet a goal within that time period. Thus, a 24-hour time period, while preferable for some applications, may be too long or too short in the opinion of a user. In this case, the user may select a different time period without alteration of the invention or its components.

Thus, the scope of the invention should be determined by the appended claims and their legal equivalents, rather than by the examples given.

What is claimed is:

1. A device for teaching children about good nutrition, comprising a board divided into a plurality of regions and a plurality of tokens adapted to adhere reversibly to the board, where:
    A) said plurality of tokens comprises:
        a) a plurality of first tokens, each of said first tokens corresponding to a single portion of a food or beverage item selected from a first specific food group; and
        b) a plurality of second tokens, each of said second tokens corresponding to a single portion of a food or beverage item selected from a second specific food group; and
    B) said plurality of regions comprises:
        a) a first region, where said first region is labelled as corresponding to said first specific food group; and
        b) a second region, where said second region is (1) labelled as corresponding to said second specific food group;
    whereby each of said first tokens corresponding to a single portion of a food or beverage item selected from the first specific food group is adapted to be moved onto the first region of the board, allowing an individual to easily record consumption of a portion of food or beverage from said first specific food group; and
    whereby each of said second tokens corresponding to a single portion of a food or beverage item selected from the second specific food group is adapted to be moved onto the second region of the board, allowing an individual to easily record consumption of a portion of food or beverage from said second specific food group.

2. A device as in claim 1, where the first tokens and the second tokens are adapted to stick magnetically to the board.

3. A device as in claim 2, where:
    a) the first tokens are flat and have two sides, where an image of a food or beverage item belonging to said first food group is deducted on a first side of each first token, and a magnetic backing is present on a second side of each first token; and
    b) the second tokens are flat and have two sides, where an image of a food or beverage item belonging to said second food group is deducted on a first side of each second token, and a magnetic backing is present on a second side of each second token.

4. A device as in claim 3, where the first tokens and the second tokens are disk-shaped.

5. A device as in claim 4, where the first tokens and the second tokens have a diameter of greater than 1¼ inches.

6. A device as in claim 3, where each first token is shaped like the food or beverage item depicted on its first side, and each second token is shaped like the food or beverage item depicted on its first side.

7. A device as in claim 2, where the board is adapted to adhere magnetically to a metallic surface.

8. A device as in claim 1, where the tokens are flexible pieces of plastic which are adapted to adhere electrostatically to the board.

9. A device as in claim 1, where the tokens are pieces of material having a backing comprising a piece of fabric having a plurality of protruding nylon hooks, and the board has a surface comprising a piece of fabric having a plurality of protruding nylon loops, Where the nylon hooks are adapted to adhere the backing to the board by reversibly engaging the nylon loops.

10. A device as in claim 1, further comprising a single third token which is adapted to be adhered to the board after a predetermined number of first tokens have been moved onto the first region of the board and a predetermined number of second tokens have been moved onto the second region of the board, said third token serving as recognition that a desired number of items from the first food group and a desired number of items from the second food group have been consumed.

11. A device for teaching children about good nutrition, comprising a board divided into a plurality of regions and a plurality of tokens adapted to adhere reversibly to the board, where:
    A) said plurality of tokens comprises:
        a) a plurality of first tokens, each of said first tokens corresponding to a single portion of a bread or cereal;
        b) a plurality of second tokens, each of said second tokens corresponding to a single portion of a vegetable;
        c) a plurality of third tokens, each of said third tokens corresponding to a single portion of a fruit; and
        d) a plurality of fourth tokens, each of said fourth tokens corresponding to a single portion of milk, yogurt, or cheese; and
    B) said plurality of regions comprises:
        a) a first region, where said first region is labelled as corresponding to either a bread or cereal food group food group;

b) a second region, where said second region is labelled as corresponding to a vegetable food group;
c) a third region, where said third region is labelled as corresponding to a fruit food group;
d) a fourth region, where said fourth region is labelled as corresponding to either a milk, yogurt, or cheese food group;

whereby:
a) each of said first tokens corresponding to a single portion of a bread or cereal is adapted to be moved onto the first region of the board, allowing an individual to easily record consumption of a portion of bread or cereal;
b) each of said second tokens corresponding to a single portion of a vegetable is adapted to be moved onto the second region of the board, allowing an individual to easily record consumption of a portion of a vegetable;
c) each of said third tokens corresponding to a single portion of a fruit is adapted to be moved onto the third region of the board, allowing an individual to easily record consumption of a portion of fruit; and
d) each of said fourth tokens corresponding to a single portion of a vegetable is adapted to be moved onto the fourth region of the board, allowing an individual to easily record consumption of a portion of milk, yogurt, or cheese.

12. The device of claim 11, further characterized in that:
A) said plurality of tokens additionally comprises:
   e) a plurality of fifth tokens, each of said fifth tokens corresponding to a single portion of a meat; and
B) said plurality of regions additionally comprises:
   e) a fifth region, where said fifth region is labelled as corresponding to a meat food group;
whereby:
   e) each of said fifth tokens corresponding to a single portion of a meat is adapted to be moved onto the fifth region of the board, allowing an individual to easily record consumption of a portion of a meat.

13. The device of claim 12, further characterized in that:
A) said plurality of tokens additionally comprises:
   f) a plurality of sixth tokens, each of said sixth tokens corresponding to a single portion of water or another non-dairy beverage; and
B) said plurality of regions additionally comprises:
   f) a sixth region, where said sixth region is labelled as corresponding to water;
whereby:
   f) each of said sixth tokens corresponding to a single portion of water or another non-dairy beverage is adapted to be moved onto the sixth region of the board, allowing an individual to easily record consumption of fluids.

14. The device of claim 13, where:
a) each of the first tokens is a flat disk which has a picture of a bread or cereal on one side;
b) each of the second tokens is a flat disk which has a picture of a vegetable on one side;
c) each of the third tokens is a flat disk which has a picture of a fruit on one side; and
d) each of the fourth tokens is a flat disk which has a picture of a container of milk, a container of yogurt, or cheese on one side;
e) each of the fifth tokens is a flat disk which has a picture of a meat on one side; and
f) each of the sixth tokens is flat and shaped like a square or hexagon, and has a picture of an ice cube on one side.

15. The device of claim 12, where said plurality of tokens comprises from 6 to 11 first tokens, from 3 to 5 second tokens, from 2 to 4 third tokens, from 2 to 3 fourth tokens, and from 2 to 3 fifth tokens; and where said first region is large enough to accommodate from 6 to 11 first tokens, said second region is large enough to accommodate from 3 to 5 second tokens, said third region is large enough to accommodate from 2 to 4 third tokens, said fourth region is large enough to accommodate from 2 to 3 fourth tokens, and said fifth region is large enough to accommodate from 2 to 3 fifth tokens.

16. The device of claim 12, where the board is divided into six regions, said six regions comprising:
a) said first region, corresponding to the bread or cereal food group;
b) said second region, corresponding to the vegetable food group;
c) said third region, corresponding to the fruit food group;
d) said fourth region, corresponding to the milk, yogurt, or cheese food group;
e) said fifth region, corresponding to the meat food group; and
f) a sixth region, corresponding to the fats and sweets food group.

17. The device of claim 16, where the board is triangular and the six regions are arranged as in the Food Guide Pyramid.

18. The device of claim 11, further characterized in that:
A) said plurality of tokens additionally comprises:
   e) a plurality of fifth tokens, each of said fifth tokens corresponding to a single portion of nuts, beans, and meat substitutes; and
   f) a plurality of sixth tokens, each of said sixth tokens corresponding to a single portion of a fat or sweet;
B) said plurality of regions additionally comprises:
   e) a fifth region, where said fifth region is labelled as corresponding to a nuts, beans, and meat substitutes food group;
   f) a sixth region, where said sixth region is labelled as corresponding to fats or sweets food group;
whereby:
   e) each of said fifth tokens corresponding to a single portion of a meat is adapted to be moved onto the fifth region of the board, allowing an individual to easily record consumption of a portion of nuts, beans, or meat substitutes; and
   f) each of said sixth tokens corresponding to a single portion of a fat or sweet is adapted to be moved onto the sixth region of the board, allowing an individual to easily record consumption of a portion of fat or sweets.

19. The device of claim 11, where:
a) each of the first tokens is a flat disk which has a picture of a bread or cereal on one side;
b) each of the second tokens is a flat disk which has a picture of a vegetable on one side;
c) each of the third tokens is a flat disk which has a picture of a fruit on one side; and
d) each of the fourth tokens is a flat disk which has a picture of a container of milk, a container of yogurt, or cheese on one side.

20. A device for teaching children about good nutrition, comprising a first board, a second board, and a plurality of tokens adapted to adhere reversibly to the boards, where:

A) said plurality of tokens comprises:
  a) a plurality of first tokens, each of said first tokens corresponding to a single portion of a food item selected from a first specific food group;
  b) a plurality of second tokens, each of said second tokens corresponding to a single portion of a food item selected from a second specific food group;
  c) a plurality of third tokens, each of said third tokens corresponding to a single portion of water or another non-dairy beverage; and B) a first side of said first board is divided into a plurality of regions, where said plurality of regions comprises:
  a) a first region, where said first region is labelled as corresponding to said first specific food group; and
  b) a second region, where said second region is labelled as corresponding to said second specific food group; and C) a first side of said second board comprises a third region, where said third region is labelled as corresponding to water;

whereby:
  a) each of said first tokens corresponding to a single portion of a food item selected from the first specific food group is adapted to be moved onto the first region of the first board, allowing an individual to easily record consumption of a portion of food or beverage from said first specific food group;
  b) each of said second tokens corresponding to a single portion of a food item selected from the second specific food group is adapted to be moved onto the second region of the first board, allowing an individual to easily record consumption of a portion of food or beverage from said second specific food group; and
  c) each of said third tokens corresponding to a single portion of water or another non-dairy beverage is adapted to be moved onto the third region of the second board, allowing an individual to easily record consumption of fluids.

21. A puzzle for teaching children about good nutrition, comprising a board and a plurality of pieces, where:
A) said plurality of pieces comprises:
  a) a plurality of first pieces, each of said first pieces corresponding to a single portion of a food or beverage item selected from a first specific food group; and
  b) a plurality of second pieces, each of said second pieces corresponding to a single portion of a food or beverage item selected from a second specific food group; and B) said board is divided into a plurality of regions, said plurality of regions comprising:
  a) a first region, where said first region of the board is labelled as corresponding to said first specific food group and where said first region of the board has a predetermined number of holes cut therethrough, each of said holes being adapted to accommodate one of said first pieces; and
  b) a second region, where said second region of the board is labelled as corresponding to said second specific food group and where said second region of the board has a predetermined number of holes cut therethrough, each of said holes being adapted to accommodate one of said second pieces;

whereby each of said first pieces corresponding to a single portion of a food or beverage item selected from the first specific food group is adapted to be fitted into one of the holes in the first region of the board, allowing an individual to easily record consumption of a portion of food or beverage from said first specific food group; and whereby each of said second pieces corresponding to a single portion of a food or beverage item selected from the second specific food group is adapted to be fitted into one of the holes in the second region of the board, allowing an individual to easily record consumption of a portion of food or beverage from said second specific food group.

22. The puzzle of claim 21, further characterized in that:
a) each of said first pieces has a first side and a second side, where the first side of each first piece has an incomplete portion of a picture printed thereon; and each of said second pieces has a first side and a second side, where the first side of each second piece has an incomplete portion of a picture printed thereon; and
b) said board has an upper surface and a lower surface, said upper surface having an incomplete picture printed thereon, said picture having holes which correspond to the holes in the first region of the board and to the holes in the second region of the board;
where each of said first pieces is adapted to be placed in a specific one of the holes in the first region of the board with its first side uppermost, so that the portion of a picture printed on the first side of each first piece fills in a hole in the picture on the upper surface of the board; and
where each of said second pieces is adapted to be placed in a specific one of the holes in the second region of the board with its first side uppermost, so that the portion of a picture printed on the first side of each second piece fills in a hole in the picture on the upper surface of the board.

23. The puzzle of claim 22, where each of the first pieces has a picture of a food or beverage item selected from said first specific food group printed on the second side of the first piece, and each of the second pieces has a picture of a food or beverage item selected from said second specific food group printed on the second side of the second piece.

24. A device for teaching children about good nutrition, comprising a first board, a second board, and a plurality of tokens adapted to adhere reversibly to either the first board or the second board, where:
A) said plurality of tokens comprises:
  a) a plurality of first tokens, each of said first tokens corresponding to a single portion of a food or beverage item selected from a first specific food group; and
  b) a plurality of second tokens, each of said second tokens corresponding to a single portion of a food or beverage item selected from a second specific food group;

B) said first board is divided into a plurality of regions, where said plurality of regions comprises:
  a) a first region, where said first region is labelled as corresponding to said first specific food group; and
  b) a second region, where said second region is labelled as corresponding to said second specific food group; and C) said second board is attached to said first board by a hinge;

whereby each of said first tokens corresponding to a single portion of a food or beverage item selected from the first specific food group is adapted to be adhered to the second board until a portion of a food or beverage item from the first food group is consumed, and then moved onto the first region of the first board, allowing an individual to easily record consumption of a portion of food or beverage from said first specific food group; and whereby each of said second tokens corresponding to a single portion of a food or beverage item selected from the second specific food group is adapted to be adhered to the second board until a portion of a food or beverage item from the first food group is consumed, and then moved onto the second region of the board, allowing an individual to easily record consumption of a portion of food or beverage from said second specific food group.

25. A device for tracking water consumption, comprising a board and a plurality of tokens adapted to adhere reversibly to the board;

where each token corresponds to a single portion of water or other non-dairy beverage, and where each of said tokens corresponding to a single portion of water or other non-dairy beverage is adapted to be moved onto the board after consumption of a portion of water or another non-dairy beverage, allowing an individual to easily record consumption of fluids.

26. A device for teaching children about good nutrition, comprising a board divided into a plurality of regions and a plurality of tokens adapted to adhere reversibly to the board, where:

A) said plurality of tokens comprises:
  a) a plurality of first tokens, each of said first tokens corresponding to a first defined number of calories; and
  b) a plurality of second tokens, each of said second tokens corresponding to a first defined number of grams of fat; and B) said plurality of regions comprises:
  a) a first region, where said first region is labelled as corresponding to calorie intake; and
  b) a second region, where said second region is (1) labelled as corresponding to fat intake;

whereby the first tokens corresponding to a to a first defined number of calories are adapted to be moved onto the first region of the board, allowing an individual to easily record consumption of a second defined number of calories by moving one or more of said first tokens into the first region of the board, where the second defined number of calories is the product of the first defined number of calories and the number of first tokens moved onto the board; and whereby the second tokens corresponding to a first defined number of grams of fat are adapted to be moved onto the second region of the board, allowing an individual to easily record consumption of a second defined number of grams of fat by moving one or more of said second tokens into the second region of the board, where the second defined number of grams of fat is the product of the first defined number of grams of fat and the number of second tokens moved onto the board.

27. A method of tracking food consumption, comprising the steps of:

a) obtaining a board divided into a plurality of regions and a plurality of tokens adapted to adhere reversibly to the board, where:
  A) said plurality of tokens comprises:
    1) a plurality of first tokens, each of said first tokens corresponding to a single portion of a food or beverage item selected from a first specific food group; and
    2) a plurality of second tokens, each of said second tokens corresponding to a single portion of a food or beverage item selected from a second specific food group; and
  B) said plurality of regions comprises:
    1) a first region, where said first region is labelled as corresponding to said first specific food group; and
    2) a second region, where said second region is labelled as corresponding to said second specific food group;

b) moving a first token onto the first region of the board each time a portion of a food from the first specific food group is consumed;

c) counting the number of first tokens in the first region of the board at the end of a defined period of time to see whether a desired number of portions of food from the first specific food group have been consumed;

d) moving a second token onto the second region of the board each time a portion of a food from the second specific food group is consumed; and e) counting the number of second tokens in the second region of the board at the end of the defined period of time to see whether a desired number of portions of food from the second specific food group have been consumed.

* * * * *